United States Patent
Raukas et al.

(12)

(10) Patent No.: US 6,761,971 B2
(45) Date of Patent: Jul. 13, 2004

(54) PROTECTIVE SPINEL COATING FOR ALUMINATE PHOSPHORS

(75) Inventors: Madis Raukas, Boston, MA (US);
Kailash C. Mishra, N. Chelmsford, MA (US); Thomas H. Reilly III, East Sandwich, MA (US)

(73) Assignee: Osram Sylvania Inc., Danvers, MA (US)

( * ) Notice: Subject to any disclaimer, the term of this patent is extended or adjusted under 35 U.S.C. 154(b) by 472 days.

(21) Appl. No.: 09/964,053

(22) Filed: Sep. 26, 2001

(65) Prior Publication Data

US 2003/0059531 A1 Mar. 27, 2003

(51) Int. Cl.$^7$ ................................................. B32B 5/16

(52) U.S. Cl. .................. 428/403; 427/215; 427/217; 427/372.2; 427/383.3; 428/701

(58) Field of Search .............................. 428/403, 699, 428/701; 427/157, 212, 215, 217, 372.2, 383.3

(56) References Cited

U.S. PATENT DOCUMENTS

| | | | | |
|---|---|---|---|---|
| 4,110,660 A | * | 8/1978 | Wolfe | 313/486 |
| 4,249,108 A | * | 2/1981 | Wolfe | 313/486 |
| 4,874,984 A | * | 10/1989 | Sigai et al. | 313/486 |
| 4,937,503 A | * | 6/1990 | Sigai et al. | 315/248 |
| 5,223,341 A | | 6/1993 | Sigai | 428/403 |
| 5,604,396 A | * | 2/1997 | Watanabe et al. | 313/485 |
| 5,611,959 A | * | 3/1997 | Kijima et al. | 252/301.4 R |
| 5,811,154 A | | 9/1998 | Ronda et al. | 427/64 |
| 5,998,047 A | * | 12/1999 | Bechtel et al. | 428/690 |
| 6,045,721 A | * | 4/2000 | Zachau et al. | 252/301.4 R |
| 6,150,757 A | * | 11/2000 | Ronda et al. | 313/486 |
| 6,472,811 B1 | * | 10/2002 | Justel et al. | 313/483 |
| 6,504,320 B2 | * | 1/2003 | Feldmann et al. | 315/289 |
| 6,602,617 B1 | * | 8/2003 | Justel et al. | 428/690 |
| 6,660,186 B2 | * | 12/2003 | Ravilisetty | 252/301.4 R |

* cited by examiner

*Primary Examiner*—H. Thile
(74) *Attorney, Agent, or Firm*—Robert F. Clark

(57) ABSTRACT

A protective coating for aluminate phosphors is described. The protective coating comprises at least a partial spinel coating having the general formula $Mg_{1-x}Al_{2(1-y)}O_{4-3y-x}$, where $0 \leq x < 1$ and $0 \leq y < 1$. The coating is applied by an aqueous solution method which may be compatible with conventional fluorescent lamp manufacturing techniques.

20 Claims, No Drawings

PROTECTIVE SPINEL COATING FOR ALUMINATE PHOSPHORS

TECHNICAL FIELD

This invention is related to protective coatings for phosphor particles. More particularly, this invention relates to aluminate phosphors such as barium magnesium aluminate activated by $Eu^{2+}$ and coatings applied thereto.

BACKGROUND OF THE INVENTION

Common aluminate phosphors include $(Ce, Tb)MgAl_{11}O_{19}:Ce^{3+},Tb^{3+}$, $Sr_4Al_{14}O_{25}:Eu^{2+}$ and $BaMgAl_{10}O_{17}:Eu^{2+}$. Such phosphors are widely used in fluorescent lamps and more recently in electronic display devices such as plasma display panels (PDP). The ability of these phosphors to resist losing brightness during the manufacture and operation of these devices is an important consideration. For example, the brightness of the widely used blue-emitting barium magnesium aluminate phosphor, $BaMgAl_{10}O_{17}:Eu^{2+}$, (BAM) degrades during the thermal processing and operation of fluorescent lamps and PDP devices. The disproportionate decrease in the light output from the blue-emitting BAM phosphor component causes an undesirable color shift in the overall emission from these devices.

The thermal degradation of the phosphors during thermal processing is believed to be related to oxidation of the activator ions. In the case of BAM phosphors, oxygen atoms are believed to diffuse into the BAM phosphor to the vicinity of the $Eu^{2+}$ ions and oxidize them. The ease with which oxygen atoms or other large ions diffuse in the BAM lattice is related to its open structure in the intermediate plane between blocks of spinel-like structures. The high temperature processing of fluorescent lamps and PDP displays promotes this oxidative degradation leading to an initial loss in lumens. The radiative degradation which occurs over time in mercury-discharge lamps is believed to be primarily due to color center formation caused by mercury's energetic vacuum-ultraviolet emission at 185 nm. This causes a further decrease in lumen output from the phosphor during the operation of fluorescent lamps.

SUMMARY OF THE INVENTION

It is an object of the invention to obviate the disadvantages of the prior art.

It is another object of the invention to provide a protective coating for reducing the thermal and radiative degradation of aluminate phosphors.

It is yet another object of the invention to provide a method for applying a protective coating which is compatible with conventional fluorescent lamp manufacturing techniques.

In accordance with one object the invention, there is provided an aluminate phosphor having at least a partial spinel coating formulated to have a general formula $Mg_{1-x}Al_{2(1-y)}O_{4-3y-x}$, where $0 \leq x < 1$ and $0 \leq y < 1$.

In accordance with another object of the invention, there is provided a method of applying at least a partial spinel coating on an aluminate phosphor comprising the steps of:
(a) combining an aqueous solution of coating precursors and an aluminate phosphor, the aqueous solution formulated to yield a spinel coating having a general formula $Mg_{1-x}Al_{2(1-y)}O_{4-3y-x}$, where $0 \leq x < 1$ and $0 \leq y < 1$;
(b) drying the aqueous solution containing the phosphor; and
(c) firing the phosphor to form the at least partial coating.

DESCRIPTION OF PREFERRED EMBODIMENTS

For a better understanding of the present invention, together with other and further objects, advantages and capabilities thereof, reference is made to the following disclosure and appended claims.

We have discovered that the thermal and radiative degradation of an aluminate phosphor, in particular, the blue-emitting barium magnesium aluminate (BAM) phosphor, $BaMgAl_{10}O_{17}:Eu^{2+}$, may be controlled by applying at least a partial spinel coating on the phosphor surface. The coating is applied by an aqueous solution method which may be compatible with current fluorescent lamp manufacturing techniques. The spinel coating is formulated to have the general formula $Mg_{1-x}Al_{2(1-y)}O_{4-3y-x}$, where $0 \leq x < 1$ and $0 \leq y < 1$. In a preferred coating composition, the values for x and y are $x=0$ and $0 \leq y < 2/3$. More preferably, x is 0 and y is about 0.5.

The spinel coating of this invention is believed to provide a diffusion barrier which reduces the oxidation of the activator ions. Known oxygen diffusion coefficients in materials having a β-alumina structure indicate that it is more difficult for oxygen ions to move through the spinel layers of β-alumina compared to diffusion along the intermediate planes of the material. Furthermore, the spinel coating contains ions already present in some aluminate phosphors, particularly BAM. As a result, the diffusion of these ions (or its significance) between the bulk phosphor and the coating during the coating process may be reduced compared to phosphors lacking aluminum and magnesium ions. Ideal spinel, $MgAl_2O_4$ is known to be transparent to the primary 254 nm UV radiation from a mercury discharge and has a relatively dense anion packing. The transparency of the spinel coating of this invention to 254 nm radiation allows the underlying phosphor to be excited by the primary UV radiation from the Hg-discharge. Furthermore, the ternary spinel composition may be varied over a wide range in order to tailor the properties of protective coating for the specific aluminate phosphor.

In a general method, the spinel coating of this invention is applied by combining the aluminate phosphor with an aqueous solution of the coating precursors which is formulated to yield the desired coating composition. The solution is then dried and the phosphor is fired to form the coating. In a preferred method, the coating precursors are nitrates and the dried phosphor is first fired in air at a lower temperature (preferably, 600° C. for 30 mins) to remove the nitrate groups and then in a reducing atmosphere at a higher temperature (preferably, 1200° C. for 90 mins). In a more preferred method, the nitrates are dissolved into a minimum amount of water at about 90° C., stirred and finally mixed with the phosphor powder in a 10% or higher weight ratio. The slurried phosphor is thereafter dried at about 120° C. in air for a few hours and oxidized at 400° C. in air for 2–3 hours. After manually breaking up the agglomerates, the phosphor powder is subjected to a flash firing procedure performed in forming gas (5% $H_2$ in $N_2$) at about 900° C. for 5 minutes. The resulting powder is manually ground for regaining the initial approximate particle size.

The beneficial influence of the spinel coating of this invention in reducing the thermal and radiative degradation of a BAM phosphor is demonstrated in the following non-limiting examples.

EXAMPLE 1

Hydrated nitrates of magnesium and aluminum, Mg$(NO_3)_2 \cdot 6H_2O$ and $Al(NO_3)_3 \cdot 9H_2O$, were used as precursors for the spinel coating. The nitrates were dissolved into 10–20 ml of de-ionized water and a europium-activated BAM phosphor, $BaMgAl_{10}O_{17}$:$Eu^{2+}$, (Type 2461, manufactured by OSRAM SYLVANIA Products Inc., Towanda, Pa.) was added to this solution in the powder form. The solution was formulated to yield a spinel coating having the composition $MgAl_2O_4$, i.e., x=0 and y=0. The weight of the nitrates was adjusted to produce a spinel coating of 10 percent by weight compared to that of the phosphor. This is sufficient for a coating of about 50 nm in thickness on each particle based on an approximation of phosphor particles as platelets having the dimensions of $5 \times 5 \times 2\ \mu m^3$. After stirring for 2 hours, the solution was dried, ground manually and fired for 30 minutes at 600° C. in air to remove the nitrate groups. After the second manual grinding, the powders were fired for 90 minutes at 1200° C. in a (5% $H_2$)—$N_2$ atmosphere.

Samples before and after final firing were analyzed using x-ray diffraction (XRD), x-ray photoelectron spectroscopy (XPS), scanning electron microscopy (SEM) techniques and by optical spectroscopy. XRD data indicate clearly the formation of the spinel phase in addition to the BAM diffraction pattern. The results from the XPS analysis show the signal from barium being reduced by 30% whereas the reduction in europium signal is nearly 70% in addition to a substantial increase in signal from magnesium. An enhancement of the magnesium to aluminum ratio on the surface from the observed value of 0.01 (for BAM) to about 0.03 indicates at least a partial spinel coating was formed on the surface of the phosphor particles.

Approximately, half of each of the coated samples was heated to 600° C. for 30 minutes in air, together with an uncoated control sample. Luminescence from the samples was measured in a SPEX Fluorolog-2 spectrometer under 254 nm excitation. The brightness results are given in Table 1 in terms of the relative integrated radiance of the $Eu^{2+}$ emission band around 450 nm. The application of the spinel coating reduces the initial brightness of the phosphor by 10% but protects the phosphor from degrading further. The brightness of coated BAM phosphor is at least about 10% greater compared to the uncoated sample after the heat treatment. Emission spectra of the samples show no changes in the emission curves of the coated phosphors relative to the uncoated phosphor.

TABLE 1

| Sample | Relative integrated radiance | |
|---|---|---|
| | before heat treatment | after 30 min at 600° C. air |
| uncoated | 1.00 | 0.68 |
| coated | 0.90 | 0.76 |

These results demonstrate the use of a spinel coating as a protective layer against the oxidative degradation of BAM phosphors.

EXAMPLE 2

The slow radiative degradation of BAM in Hg-discharge lamps can be simulated by a rapid test using radiation from an excimer laser source at about 190 nm (e.g., 193 nm ArF excimer radiation). After being irradiated for 4.5 hours at the power density of 7.5W/cm$^2$, the coated BAM phosphor sample retained 65% of its initial emission under 254 nm excitation compared to 45% for an uncoated phosphor sample. Thus, the spinel-coated phosphor may retain more than about 50%, and preferably more than about 60%, of its initial brightness under these severe conditions. This demonstrates a significant reduction in the radiative degradation of the europium-activated BAM.

While there has been shown and described what are at the present considered the preferred embodiments of the invention, it will be obvious to those skilled in the art that various changes and modifications may be made therein without departing from the scope of the invention as defined by the appended claims.

We claim:

1. An aluminate phosphor having at least a partial spinel coating formulated to have a general formula $Mg_{1-x}Al_{2(1-y)}O_{4-3y-x}$, where $0 \leq x < 1$ and $0 \leq y < 1$.

2. The phosphor of claim 1 wherein x=0 and $0 \leq y \leq 2/3$.

3. The phosphor of claim 1 wherein x is 0 and y is about 0.5.

4. The phosphor of claim 1 wherein the phosphor is a barium magnesium aluminate activated with divalent europium.

5. The phosphor of claim 4 wherein x=0 and $0 \leq y < 2/3$.

6. The phosphor of claim 4 wherein x is 0 and y is about 0.5.

7. The phosphor of claim 4 wherein the brightness of the phosphor is at least about 10% greater than the brightness of the same phosphor without the coating after both phosphors have heated in air at 600° C. for 30 minutes.

8. The phosphor of claim 4 wherein the phosphor retains more than about 50% of its initial brightness after exposure to UV radiation at about 190 nm for 4.5 hours at a power density of 7.5W/cm$^2$.

9. The phosphor of claim 8 wherein the phosphor retains more than about 60% of its initial brightness.

10. The phosphor of claim 1 wherein the phosphor has a brightness greater than the same phosphor without the coating after both phosphors have been heated in air under the same conditions.

11. The phosphor of claim 1 wherein the phosphor retains a larger percentage of its initial brightness compared to the percentage of initial brightness retained by the same phosphor without the coating after both phosphors have been subjected to exposure to UV radiation at about 190 nm under the same conditions.

12. A method of applying at least a partial spinel coating on an aluminate phosphor comprising the steps of:
    (a) combining an aqueous solution of coating precursors and an aluminate phosphor, the aqueous solution formulated to yield a spinel coating having a general formula $Mg_{1-x}Al_{2(1-y)}O_{4-3y-x}$, where $0 \leq x < 1$ and $0 \leq y < 1$;
    (b) drying the aqueous solution containing the phosphor; and
    (c) firing the phosphor to form the at least partial coating.

13. The method of claim 12 wherein the coating precursors are nitrates and step c) comprises firing the phosphor in air to remove the nitrate groups followed by a firing in a reducing atmosphere.

14. The method of claim 13 wherein the firing in air is performed at 600° C. for 30 minutes and the firing in the reducing atmosphere is performed in a (5% $H_2$)—$N_2$ atmosphere at 1200° C. for 90 minutes.

15. The method of claim 14 wherein the phosphor is a barium magnesium aluminate phosphor activated with divalent europium.

16. The method of claim 15 wherein the coating precursors are hydrated nitrates of magnesium and aluminum.

17. The method of claim 16 wherein x=0 and $0 \leq y \leq 2/3$.

18. The method of claim 12 wherein x=0 and $0 \leq y \leq 2/3$.

19. The method of claim 12 wherein x is 0 and y is about 0.5.

20. A method of applying at least a partial spinel coating on an aluminate phosphor comprising the steps of:
  (a) dissolving aluminum and magnesium nitrates in a minimum amount of water at about 90° C. to form an aqueous solution, the solution being formulated to yield a spinel coating having a general formula $Mg_{1-x}Al_{2(1-y)}O_{4-3y-x}$, where $0 \leq x < 1$ and $0 \leq y \leq 2/3$;
  (b) combining the dissolved nitrates with an aluminate phosphor to form a phosphor slurry;
  c) drying the phosphor slurry and firing the dried phosphor in air at 400° C. for 2 to 3 hours; and
  d) subjecting the phosphor to a flash firing in a reducing atmosphere at about 900° C.

* * * * *